United States Patent [19]

Colella et al.

[11] Patent Number: 4,841,643
[45] Date of Patent: Jun. 27, 1989

[54] DRILL POWERED SABER SAW

[76] Inventors: Vincent J. Colella, 1N 120 Morse, Wheaton, Ill. 60188; George Spector, 233 Broadway RM 3815, New York, N.Y. 10007

[21] Appl. No.: 184,893

[22] Filed: Apr. 22, 1988

[51] Int. Cl.⁴ .............................................. B77B 19/00
[52] U.S. Cl. ........................................ 30/500; 30/393
[58] Field of Search .......................... 30/500, 392–394, 30/122; 81/181; 7/170

[56] References Cited

U.S. PATENT DOCUMENTS

| 1,481,055 | 1/1924 | Fullbright | 30/394 |
| 2,746,493 | 5/1956 | Babcock | 30/394 |
| 2,793,661 | 5/1957 | Olson | 30/393 |

Primary Examiner—Douglas D. Watts

[57] ABSTRACT

A device for activating a saber saw from a hand drill is provided and consists of a stationary base member for the hand drill to be attached to with an elongated flexible operating cable extending from the chuck of the hand drill to a drive mechanism within the housing of the saber saw which converts rotary motion from the motor of the hand drill to reciprocating motion to the saber saw.

5 Claims, 1 Drawing Sheet

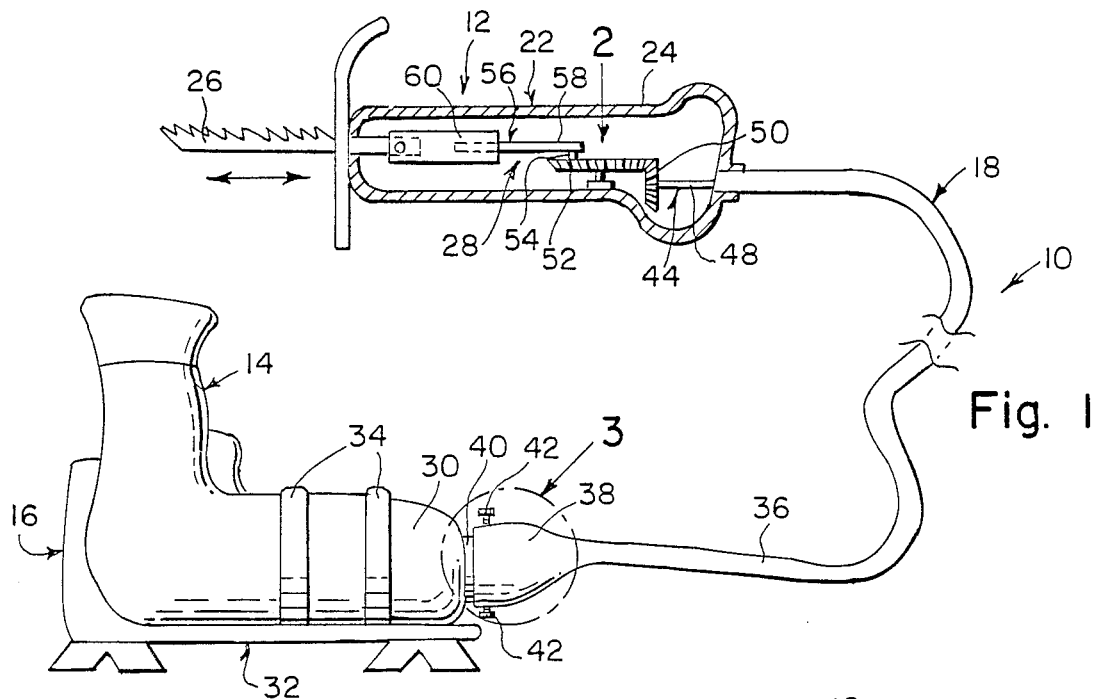
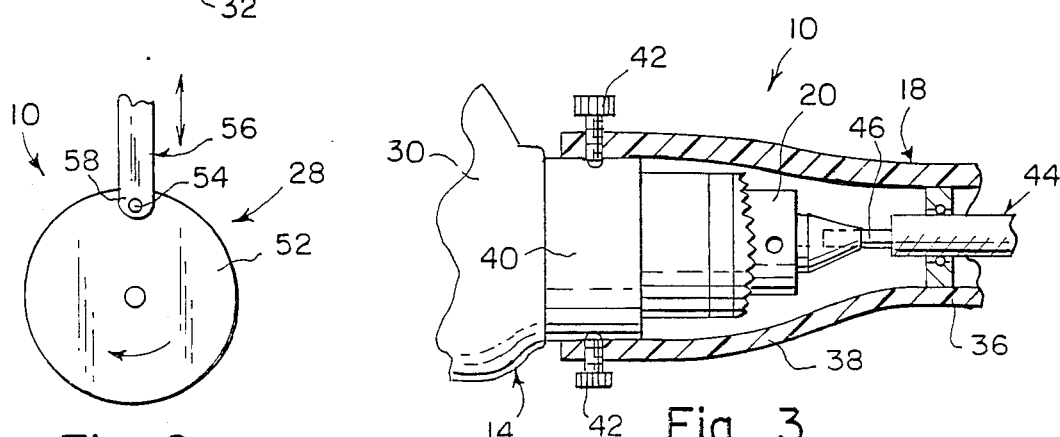
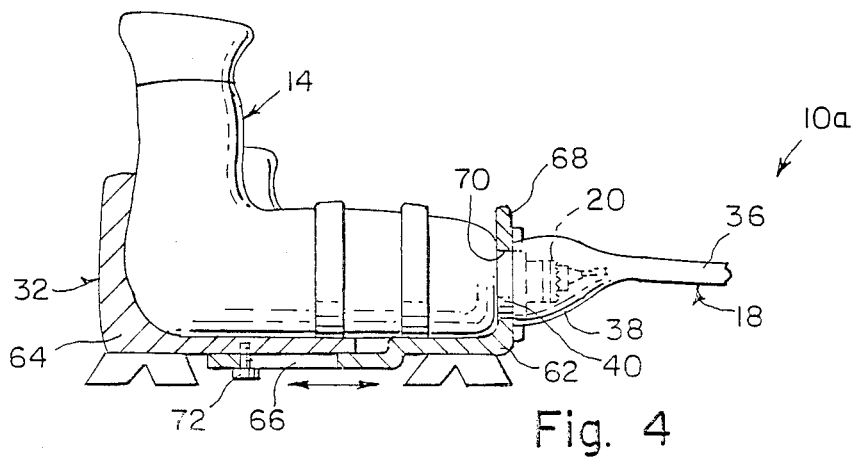
Fig. 1
Fig. 2
Fig. 3
Fig. 4

DRILL POWERED SABER SAW

BACKGROUND OF THE INVENTION

The instant invention relates generally to attachments to power tools and more specifically it relates to a device for actuating a saber saw from a hand drill.

Numerous attachments to power tools have been provided on prior art that are each adapted to be directly connected by a shaft to a chuck of the power tool so as to be operated therefrom. For example, U.S. Pat. Nos. 2,668,567; 2,713,271 and 3,260,289 all are illustrative of such prior art. While these units may be suitable for the particular purpose to which they address, they would not be as suitable for the purposes of the present invention as heretofore described.

SUMMARY OF THE INVENTION

A primary object of the present invention is to provide a device for actuating a saber saw from a hand drill that will overcome the shortcomings of the prior art devices.

Another object is to provide a device for actuating a saber saw from a hand drill which will convert a rotary motion from the motor of the hand drill to a reciprocating motion to the saber saw.

An additional object is to provide a device for actuating a saber saw from a hand drill in which the hand drill is attached to a stationary base member with an elongated flexible operating cable extending from the chuck of the hand drill to a drive mechanism within the housing of the saber saw so that a person can hold the saber saw and reach difficult places a standard saber saw will not reach.

A further object is to provide a device for actuating a saber saw from a hand drill that is simple and easy to use.

A still further object is to provide a device for actuating a saber saw from a hand drill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view with parts broken away of the invention operated by a hand drill.

FIG. 2 is an end view taken in direction of arrow 2 showing the off set gear in greater detail.

FIG. 3 is an enlarged cross sectional view as indicated by numeral 3 in FIG. 1, showing the head coupling of the flexible cable in greater detail.

FIG. 4 is a side cross sectional view of a modification being an adjustable base with head of the flexible cable attached to the base.

DETAILED DESCRIPTION OF THE PREFERRED EMBODIMENTS

Turning now descriptively to the drawings, in which similar reference characters denote similar elements throughout the several views, FIGS. 1 through 3 illustrate a device 10 for actuating a saber saw 12 form a hand drill 14 consisting of a structure 16 for securing the hand drill 14 in a stationary position. An elongated flexible operating cable 18 extends from the chuck 20 of the hand drill 14. A saber saw unit 22 is provided that includes a housing 24, a blade 26 and a drive mechanism 28 within the housing 24 driven by the cable 18. The drive mechanism 28 converts rotary motion from motor 30 of the hand drill 14 to a reciprocating motion to the saber saw blade 26, so that a person (not shown) holding the saber saw unit 22 can reach difficult places a standard saber saw will not reach.

The securing structure 16 contains a base member 32 and VELCRO straps 34 affixed to the base member for holding the hand drill 14 stationary and inverted on the base member 32. The cable 18 includes an outer flexible sleeve 36 that has an enlarged head 38 at one end to fit over the chuck 20 and onto a collar 40 of the hand drill 14. Set screws 42 are for securing the head 38 onto the collar 40 of the hand drill 14. An inner flexible rotatable shaft 44 has one end 46 attached to the chuck 20 of the hand drill 14 and other end 48 attached to the drive mechanism 28.

The drive mechanism 28 includes a first bevel gear 50 attached to the other end 48 of the inner flexible rotatable shaft 44. A second bevel gear 52 is rotatable within the saber saw unit 22 and meshing at a right angle with the first bevel gear 50. A pin 54 is mounted at one point on perimeter of the second bevel gear 52. An arm 56 is pivotly mounted at one end 58 to the pin 54 and secured at other end 60 to the saber saw blade 26 which extends through the housing 24 so that then the second bevel gear 52 rotates the arm 56 will move in a reciprocating motion.

FIG. 4 shows the base member 32 being adjustable to compensate for various sized hand drills 14 and includes two segments 62 and 64, one of the segments 62 has an elongated slot 66 therein and an upturned front leg 68 that has an aperture 70 therein to accept the chuck 20 of the hand drill 14. The head 38 on the outer flexible sleeve 36 can fit over the chuck 20, onto the collar 40 of the hand drill 14 and be affixed to the upturned front leg 68. A locking screw 72 fits through the elongated slot 66 and threads into other segment 64 to secure the segments 62 and 64 together.

While certain novel features of this invention have been shown and described and are pointed out in the annexed claims, it will be understood that various omissions, substitutions and changes i the forms and details of the device illustrated and in its operation can be made by those skilled in the art without departing from the spirit of the invention.

What is claimed is:

1. A device for actuating a saber saw from a hand drill which comprises:
   (a) means for securing the hand drill in a stationary position;
   (b) an elongated flexible operating cable extending from the chuck of the hand drill; and
   (c) a saber saw unit including a housing, a blade and a drive mechanism with the housing driven by said cable, said drive mechanism converts rotary motion from motor of the hand drill to a reciprocating motion to said saber saw blade so that a person holding said saber saw unit can reach difficult places a standard saber saw will not reach.

2. A device as recited in claim 1, wherein said securing means comprises:
(a) a base member; and
(b) VELCRO straps affixed to said base member for holding the hand drill stationary and inverted on said base member.

3. A device as recited in claim 2, wherein said cable further includes:
(a) an outer flexible sleeve having an enlarged head at one end to fit over the chuck and onto a collar of the hand drill;
(b) at least one set screw for securing said head onto the collar of said hand drill; and
(c) an inner flexible rotatable shaft having one end attached to the chuck of the hand drill and other end attached to said drive mechanism.

4. A device as recited in claim 3, wherein said drive mechanism includes:
(a) a first bevel gear attached to the other end of said inner flexible rotatable shaft;
(b) a second bevel gear rotatable within said saber saw unit and meshing at right angle with said first bevel gear;
(c) a pin mounted at one point on perimeter of said second bevel gear; and
(d) an arm pivotally mounted at one end to said pin and secured at other end to said saber saw blade which extends through said housing so that when said second bevel gear rotates said arm will move in a reciprocating motion.

5. A device as recited in claim 4, wherein said base member is adjustable to compensate for various sized hand drills and includes:
(a) two segments, one of said segments having an elongated slot therein and an upturned front leg having an aperture therethrough to accept the chuck of the hand drill so that said head on said outer flexible sleeve can fit over the chuck, onto the collar of the hand drill and be affixed to said upturned front leg; and
(b) a locking screw which fits through said elongated slot and threaded into other of said segments to secure said segments together.

* * * * *